Oct. 16, 1928.
C. W. WALLER
PRICE GAUGE
Filed Oct. 24, 1927
1,688,254
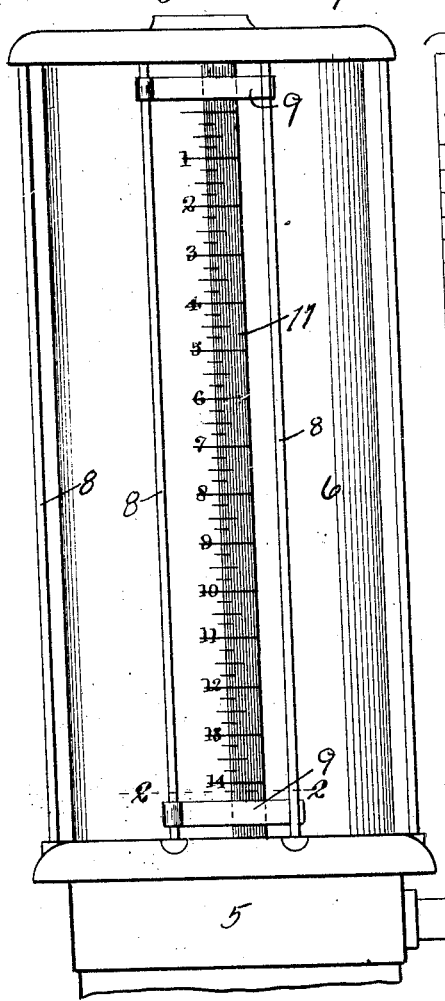
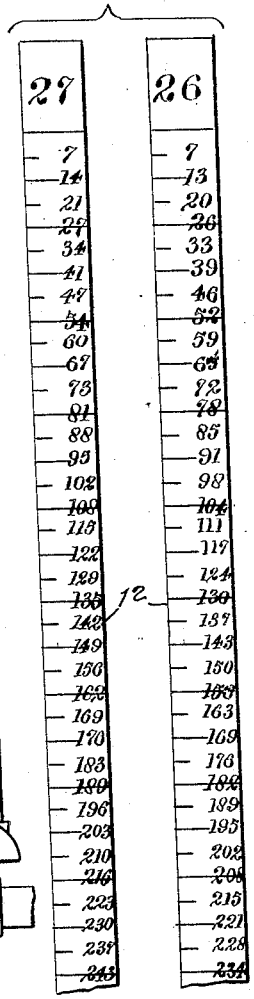
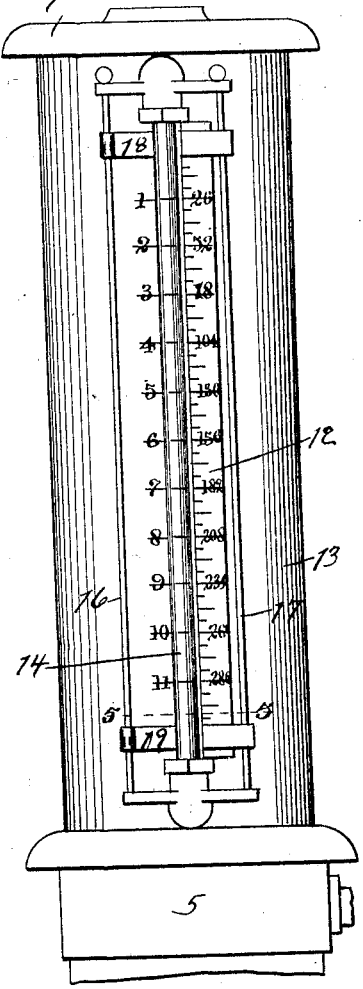
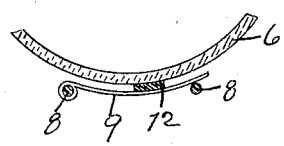
Inventor.
C. W. WALLER
Victor J. Evans
By Attorney.

Patented Oct. 16, 1928.

1,688,254

UNITED STATES PATENT OFFICE.

CHARLES W. WALLER, OF FORT KLAMATH, OREGON.

PRICE GAUGE.

Application filed October 24, 1927. Serial No. 228,440.

This invention relates to improvements in price gauges, and has particular reference to a gauge whereby the price of a fluid commodity such as gasoline may be readily observed when being dispensed from a visible pump.

Another object of the present invention is to produce a device of this character which may be readily attached to any form of visible pump now upon the market.

Another object is to produce a device having means whereby the price gauge may be changed from time to time in accordance with the various changes in the price of gasoline per gallon.

A further object is to produce a device of this character which is economical to manufacture and one which is neat in appearance.

Other objects and advantages will be apparent during the course of the following description.

In the accompanying drawings forming a part of this specification, and in which like numerals are employed to designate like parts throughout the same, Figure 1 is a front elevation of a gasoline pump wherein the gasoline to be dispensed is maintained in a visible tank, Figure 2 is a cross section taken on the line 2—2 of Figure 1, Figure 3 is a front elevation of two price gauges showing the price of gasoline as twenty-six cents and twenty-five cents, and Figure 4 is a view similar to Figure 1, showing one of my gauges attached to a pump of that type wherein a tubular glass gauge is employed upon an invisible tank.

Fig. 5 is a cross section taken in line 5—5 of Fig. 4.

In dispensing gasoline many forms of tanks are now employed, some having a visible tank which is virtually a glass cylinder from which the gasoline is dispensed, others having a metal cylinder to the outer surface of which is attached a tubular glass gauge, and still others are of the invisible type to which my invention does not refer.

It is necessary at the present time, for the operator of the pump to mentally calculate the cost of the amount of gasoline dispensed, or to consult a table located at a remote point from the gasoline tank.

I have therefore devised a gauge which may be so associated with the gasoline tank or pump as the same is often termed, which gauge may be readily changed to accommodate for varying prices. This gauge is placed adjacent the tank so that the level of the gasoline in the tank will indicate upon the gauge, the amount of the gasoline purchased.

In the accompanying drawings wherein for the purpose of illustration is shown a preferred example of my invention, the numeral 5 designates a pump casing upon which a glass cylinder 6 is positioned. This tank has the usual cover 7 and connecting rods 8. This construction is common to all tanks of this type.

My invention consists in placing a pair of clips 9 upon two of the rods 8 so that one of my gauges may be readily held behind the clips and against the marking 11 upon the glass cylinder 6.

I have shown two of my gauges and designated the same by the numeral 12 in Figure 3. One of these gauges bears the numeral "26" at the top and the other bears the numeral "27". The gauge bearing the numeral "26" is so calibrated that it will correspond to the markings 11 on the tank, and price indicia which corresponds to the amounts which would be due at a "26" rate for a withdrawal from the tank down to the particular indicia which is to be read.

The gauge bearing the numeral "27" is identical in construction, with the exception that the indicia has been varied to correspond with twenty-seven cents rate.

In the form shown in Figure 4, the construction is identical with the exception that the tank 13 is made of metal and therefore the contents are invisible. In this type of gasoline tank, a tubular glass gauge 14 is employed which is protected by guards 16 and 17. To these guards I attach a pair of clips 18 and 19 between which clips I position one of my gauges 12. The operation of the gauge is identical with both types of pumps.

The result of this construction is that when a customer requests five gallons of gasoline and the prevailing price is twenty-six cents a gallon, as soon as the gasoline level has been drawn down in the tank to the five gallon mark, the operator will look at the gauge 12 and will immediately see that the cost to the customer is $1.30.

Should the customer ask that his gas tank be filled and it takes for instance, five gallons and one quart, the gasoline line in the tank would then be one mark below the five gallon mark and would indicate $1.37.

In another instance, assuming that a customer desired $1.50 worth of gasoline, the operator would allow the gasoline level to reach the "$1.50" mark on the gauge, which would be three quarts over five gallons, that is, assuming the rate is twenty-six cents.

It will therefore be seen that I have provided a device wherein it is possible to quickly serve a customer and to accurately determine the amount which the customer must pay, or to determine the amount of gasoline which is to be dispensed at a given amount.

It is to be understood that the form of my invention herewith shown and described is to be taken as a preferred example of the same and that various changes relative to the shape, size, material and arrangement of parts may be resorted to without departing from the spirit of the invention, or the scope of the subjoined claim.

Having thus described my invention, I claim:—

In combination with a gasoline pump having a visible dispensing cylinder upon which indicia is placed, of a price gauge adapted to be supported in contact with said cylinder, a pair of rods positioned adjacent said cylinder and spaced therefrom, said rods being parallel to said price gauge and slidable clips vertically movable on said rods, said clips having a curvature corresponding to the curvature of said dispensing cylinder and adapted to engage said price strip for the purpose of holding said price strip against said dispensing cylinder at a point between said rods.

In testimony whereof I affix my signature.

CHARLES W. WALLER.